(12) United States Patent
Fuhs et al.

(10) Patent No.: US 7,681,003 B2
(45) Date of Patent: *Mar. 16, 2010

(54) MOVING HARDWARE CONTEXT STRUCTURES IN MEMORY WHILE MAINTAINING SYSTEM OPERATION

(75) Inventors: Ronald Edward Fuhs, Rochester, MN (US); Ryan Scott Haraden, Rochester, MN (US); Bruce Marshall Walk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 86 days.

This patent is subject to a terminal disclaimer.

(21) Appl. No.: 12/134,052

(22) Filed: Jun. 5, 2008

(65) Prior Publication Data

US 2008/0235478 A1   Sep. 25, 2008

Related U.S. Application Data

(63) Continuation of application No. 10/845,498, filed on May 13, 2004, now Pat. No. 7,475,209.

(51) Int. Cl.
*G06F 12/00* (2006.01)
(52) U.S. Cl. .............................. 711/165; 711/E12.002
(58) Field of Classification Search .................. None
See application file for complete search history.

(56) References Cited

U.S. PATENT DOCUMENTS

| | | | |
|---|---|---|---|
| 5,537,588 | A | 7/1996 | Engelmann et al. |
| 5,715,423 | A | 2/1998 | Levy |
| 6,128,703 | A | 10/2000 | Bourekas et al. |
| 6,216,183 | B1 | 4/2001 | Rawlins |
| 7,080,226 | B1 | 7/2006 | Patterson |
| 2003/0076822 | A1 | 4/2003 | Shalom et al. |
| 2005/0210202 | A1 | 9/2005 | Choubal et al. |
| 2006/0143541 | A1 | 6/2006 | Kay |

OTHER PUBLICATIONS

Computer to Computer Transmission Media, http://www.jegsworks.com/Lessons/lesson7/lesson7-2.htm, Feb. 2004 (Cited by Examiner in Parent).

Hardware Context Cache, http://www.emulex.com/white/hba/cache.pdf, Dec. 2002 (Cited by Examiner in Parent).

*Primary Examiner*—Reginald G Bragdon
*Assistant Examiner*—Aracelis Ruiz
(74) *Attorney, Agent, or Firm*—Martin & Associates LLC; Derek P. Martin

(57) ABSTRACT

An adapter includes registers, a local context table, and logic that allows copying hardware context structures from a first location in memory to a second location in memory while the computer system continues to run. The local context table in the adapter is loaded with a desired block of context entries from the first location in memory. Values in the registers cause the adapter to write this desired block of context entries to the second location in memory in a way that does not inhibit the operation of the computer system.

20 Claims, 9 Drawing Sheets

Local Context Table

| | Context Entry# | Pin Bit | Context Information |
|---|---|---|---|
| 210A | 0 | 1 | - - - context - - - |
| 210B | 1 | 1 | - - - context - - - |
| 210C | 2 | 1 | - - - context - - - |
| 210N | N | 0 | - - - context - - - |

168

MOVING HARDWARE CONTEXT STRUCTURES IN MEMORY WHILE MAINTAINING SYSTEM OPERATION

CROSS-REFERENCE TO PARENT APPLICATION

This patent application is a continuation of U.S. Ser. No. 10/845,498 now U.S. Pat. No. 7,475,209 filed on May 13, 2004, which is incorporated herein by reference.

BACKGROUND OF THE INVENTION

1. Technical Field

This invention generally relates to computer systems, and more specifically relates to apparatus and methods for relocating hardware context structures in a computer system without halting the operation of the computer system, adapter hardware, or program applications dependent on the operation of the adapter hardware.

2. Background Art

Since the dawn of the computer age, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Advances in computer architecture are increasing system performance by using hardware state machines to implement low-level communications functions, such as bus link and transport protocol. By implementing these functions in hardware, the software is relieved of the burden of performing these functions. Because these functions may be implemented in hardware much more quickly than in software, the result is an overall improvement in system performance.

The use of virtual connections between software applications allows those applications to communicate in an efficient, predefined manner. As the number of software applications that communicate via virtual connections increases, the number of virtual connections that a computer system must support goes up dramatically. Hardware in today's computer systems needs to support a large number of virtual connections. Each virtual connection has a critical set of information that is necessary to control the transfer of data. This critical set of information is commonly referred to as "connection context." As the number of virtual connections grows, hardware state machines that perform the low-level communication functions must maintain fast accessibility to a large number of connection contexts. This can be done by maintaining the context information within an application-specific integrated circuit (ASIC), but the limitations in size of memory on an ASIC inherently limits the number of connection contexts that can be stored in the ASIC. In the alternative, a dedicated memory for storing the connection contexts could be connected to the ASIC. While a dedicated memory generally allows for more storage capacity than memory on an ASIC, it is still limited to the capacity of the memory components used. Still another way to store a large number of connection contexts is to provide a separate memory subsystem that is accessible to the ASIC and other processes. In a typical computing system, the connection contexts would be stored in a specified area of main memory. This latter approach is the most flexible of the three because the amount of memory used for connection contexts is limited only by the total system memory.

Infiniband is a communication protocol that supports bidirectional communication using queue pairs to provide virtual connections. One Infiniband host channel adapter typically supports 16,384 queue pairs. Each queue pair may require 512 bytes of context, resulting in the need for 8 megabytes (MB) of memory for context alone. In addition, the architected number of queue pairs in Infiniband is 16M. Assuming 512 bytes of context per queue pair, a host channel adapter implementing all architected queue pairs would require 8 gigabytes (GB) of memory for context.

In the prior art, there is no known way to move hardware state machine context information from one block of main memory to a different block of main memory without shutting down and restarting all of the virtual connections. For example, referring to FIG. 3, a prior art method 300 for relocating hardware context information in memory begins by shutting down all virtual connections (step 310). Next, the hardware context structure is copied from the original context memory to the new context memory (step 320). Once the copy is complete, all virtual connections have to be re-established (step 330). Shutting down all connections makes the computer system unavailable until the connections are restarted. Furthermore, there is significant overhead in shutting down and restarting all connections. Without a way to move hardware context structures without shutting down the virtual connections, the computer industry will continue to suffer from inefficient methods of moving hardware context structures in memory.

DISCLOSURE OF INVENTION

According to the preferred embodiments, an adapter includes registers, a local context table, and logic that allows copying hardware context structures from a first location in memory to a second location in memory while the computer system continues to run. The local context table in the adapter is loaded with a desired block of context entries from the first location in memory. Values in the registers cause the adapter to write this desired block of context entries to the second location in memory in a way that does not inhibit the operation of the computer system.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The present invention provides a way to move hardware context structures from one block of memory to a different block of memory while maintaining system operation. This allows moving the hardware context structures for any reason while the computer functions, such as changing or expanding memory.

Figure 1:
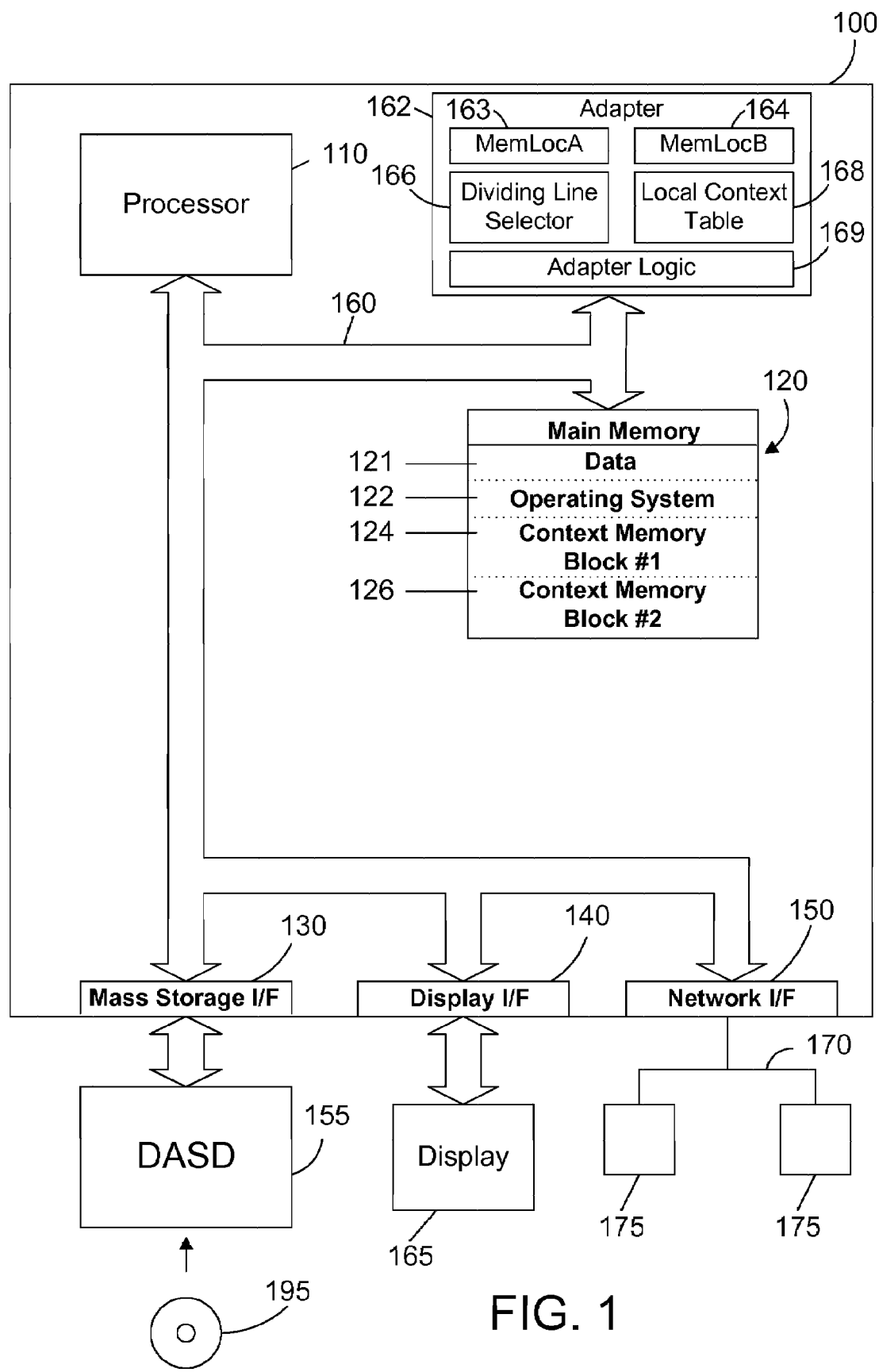
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, a network interface 150, and an adapter 162. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, a first context memory block 124, and a second context memory block 126. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system.

The context memory block 124 is a block of main memory 120 that is sufficiently large to hold all context information for the adapter 162. Context memory block 126 is a similarly-sized block of memory at a different location within main memory 120. We assume that one of the memory blocks 124, 126 is a first memory block that is currently used by the adapter 162 to hold hardware context structures, while the other memory block is a second memory block that has been allocated, and to which the contents of the first memory block needs to be written. The adapter provides functionality that allows the hardware context structures to be copied from a first memory block to a second memory block while the computer system 100 remains functional.

The adapter 162 is any hardware adapter that may need to access hardware context information. An Infiniband host channel adapter is a suitable example of an adapter that could be modified as shown and discussed herein to provide the functionality of the present invention. While adapter 162 is shown coupled directly to system bus 160, one skilled in the art will realize that the adapter 162 could be coupled in any suitable manner to bus 160 or processor 110. For example, the adapter 162 may be coupled to an I/O slot, which is in turn coupled to system bus 160.

Adapter 162 preferably includes a first register 163, a second register 164, a dividing line selector 166, a local context table 168, and adapter logic 169. The first register 163 contains an address that specifies the beginning address of the current block of memory that contains hardware context structures. The second register 164 is used to specify an address that is the beginning of the new block of memory to which the hardware context structures in the current block of memory need to be transferred. The dividing line selector 166 is used to determine which register 163, 164 to use in accessing context entries. The local context table 168 contains a small part of the hardware context structures stored in main memory. Details of the local context table 168 are shown in FIG. 2.

Figures 2, 3:
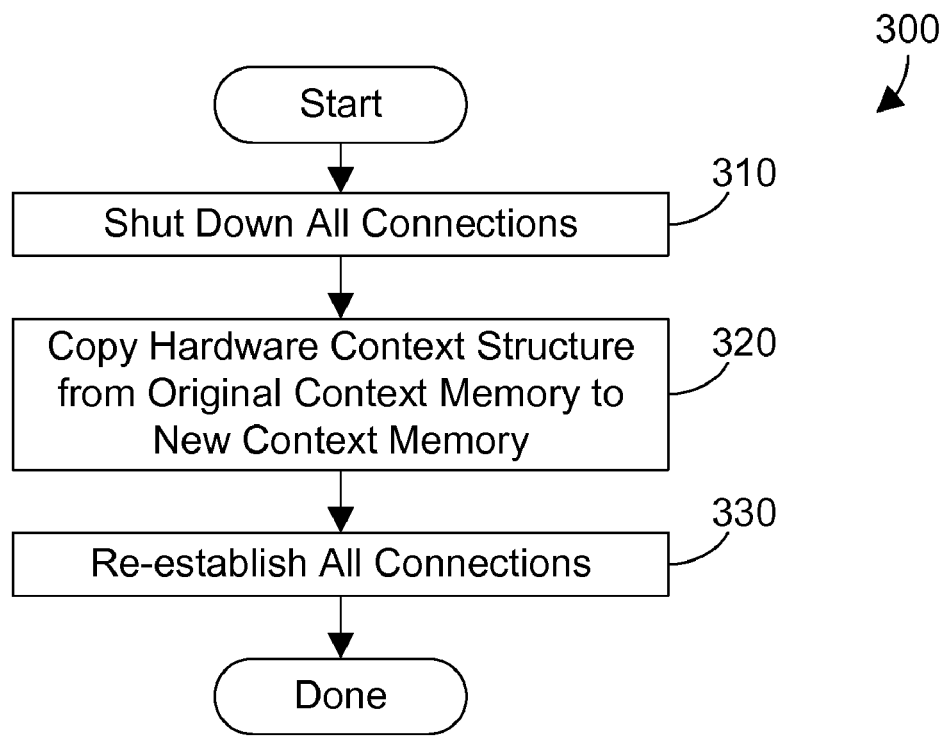
FIG. 2 shows details of the local context table shown in FIG. 1.
FIG. 3 is a flow diagram of a prior art method for copying hardware context structures from a first location in memory to a second location in memory.

Local context table 168 includes multiple entries 210 (shown in FIG. 2 as 210A, 210B, 210C, . . . , 210N. Each entry includes a context entry number, a pin bit, and context information. The context entry number is a sequential number that uniquely identifies each context entry from all others stored in the block of main memory. The context entry numbers shown in FIG. 2 are 0, 1, 2, . . . , N. The pin bit is used to determine whether the entry can be cast out to main memory. Note that the pin bit only exists within the local context memory 168, and is not stored to main memory. The context information is any suitable context information for the adapter, such as the 512 bytes of context information used for an Infiniband queue pair.

Adapter logic 169 in FIG. 1 controls the function of adapter 162. Adapter logic 169 uses the registers (163, 164 and 166) and the local context table 168 to move hardware context structures (such as context entries) from a first block of memory to a second block of memory.

Referring back to FIG. 1, computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122 and context memory blocks 124 and 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, system bus 160, and adapter 162.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links.

Figure 4:
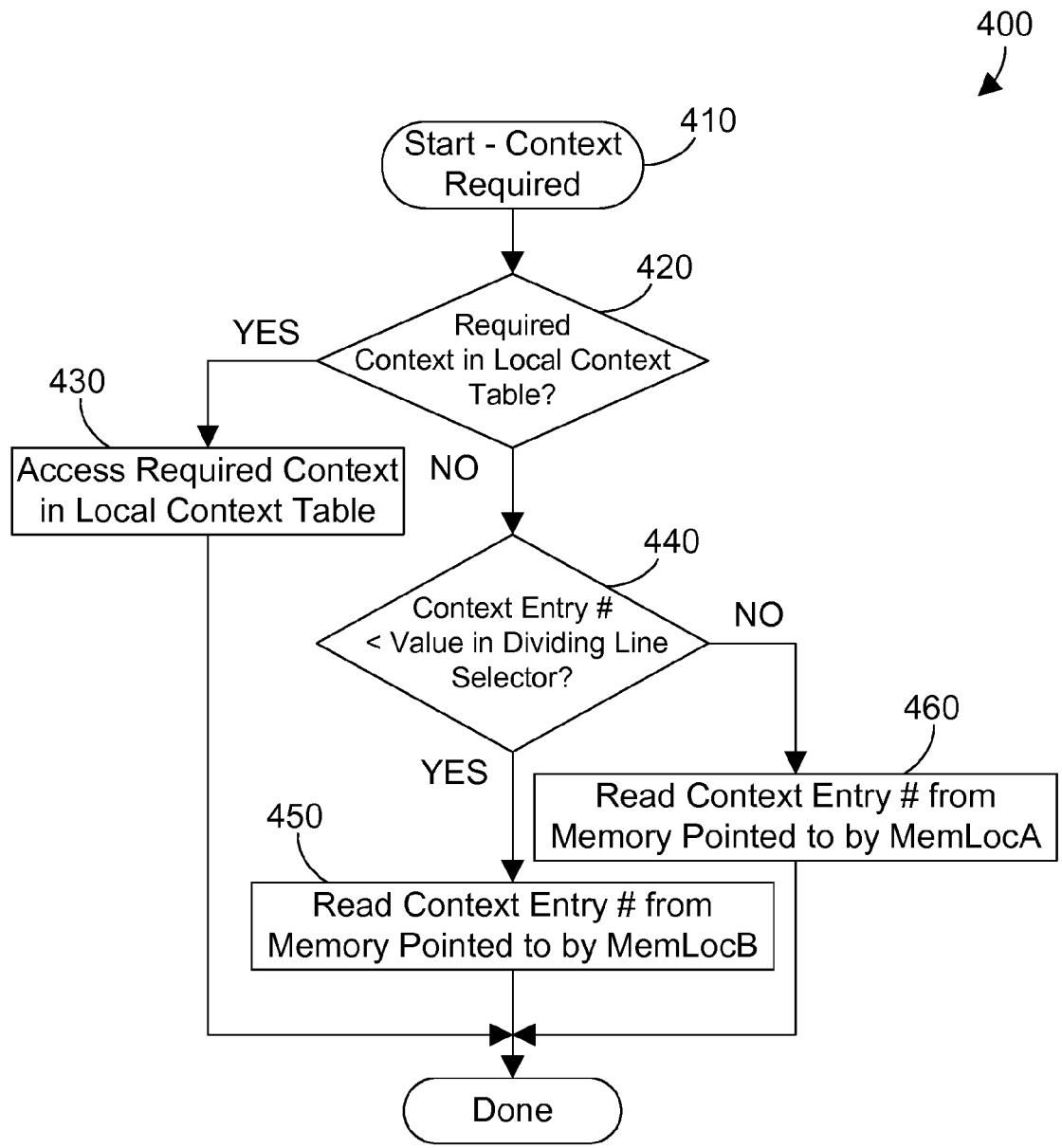
FIG. 4 is a flow diagram of a method in accordance with the preferred embodiments for the adapter of FIG. 1 to access a required context entry.

Referring to FIG. 4, a method 400 in accordance with the preferred embodiments shows the function of the adapter logic 169 in FIG. 1 when context information is required by the adapter for any functional operation (step 410). If the required context is in the local context table (step 420=YES), the required context is accessed in the local context table (step 430). If the required context is not in the local context table (step 420=NO), the adapter needs to read the required context from main memory into the local context table. In order to access the correct block of memory, the adapter looks at the value stored in the dividing line selector register 166. If the context entry number of the required context is less than the value in the dividing line selector register 166 (step 440=YES), the context entry number is read from the block of memory that begins at the address stored in the MemLocB register 164 (step 450). If the context entry number of the required context is greater than or equal to the value in the dividing line selector register 166 (step 440=NO), the context entry number is read from the block of memory that begins at the address stored in the MemLocA register 163 (step 460). In this manner the adapter uses the value stored in the dividing line selector register 166 to determine which block of memory to access for the required context entry number.

The pin bit shown in the local context table 168 in FIG. 2 is used to pin (or lock) a context entry number in the local context table. Method 500 in FIG. 5 begins when a pin bit in a context entry in the local context table is set (step 510). Note that setting of the pin bit preferably means the bit is written a value of one. If the context entry in the local context table contains the valid context information (step 520=YES), the set pin bit prevents the adapter from casting out the context entry to main memory (step 530). If the context entry in the local context table does not contain valid context information, because the valid context information resides in the main memory (step 520=NO), the context entry is read from the main memory into the local context table (step 540). With the pin bit set, the adapter cannot cast out the context entry to main memory (step 530). As a result, the setting of a pin bit for a context entry in the local context table assures the current context information for the context entry resides in the local context table, and keeps this context entry in the local context table until the pin bit is cleared.

Figure 6:
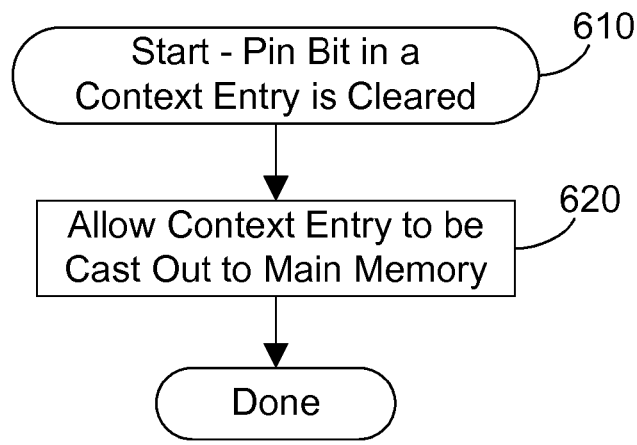
FIG. 6 is a flow diagram of a method in accordance with the preferred embodiments for the adapter of FIG. 1 to function when the pin bit in a context entry in the local context memory is cleared.

Referring to FIG. 6, a method 600 begins when a pin bit is cleared (step 610). The clearing of the pin bit preferably means the bit is written a value of zero. Once the pin bit is cleared, the context entry may be cast out of the local context table to main memory (step 620). Note that the adapter may use any suitable criteria or heuristic for casting out context entries from the local context table to main memory. The significance in method 600 is that the clearing of the pin bit allows casting out the context entry when the adapter logic 169 determines it is appropriate to do so. When the pin bit is set, the adapter logic cannot cast out the context entry, even if it's criteria for casting out context entries from the local context memory to main memory is otherwise satisfied.

Figure 7:
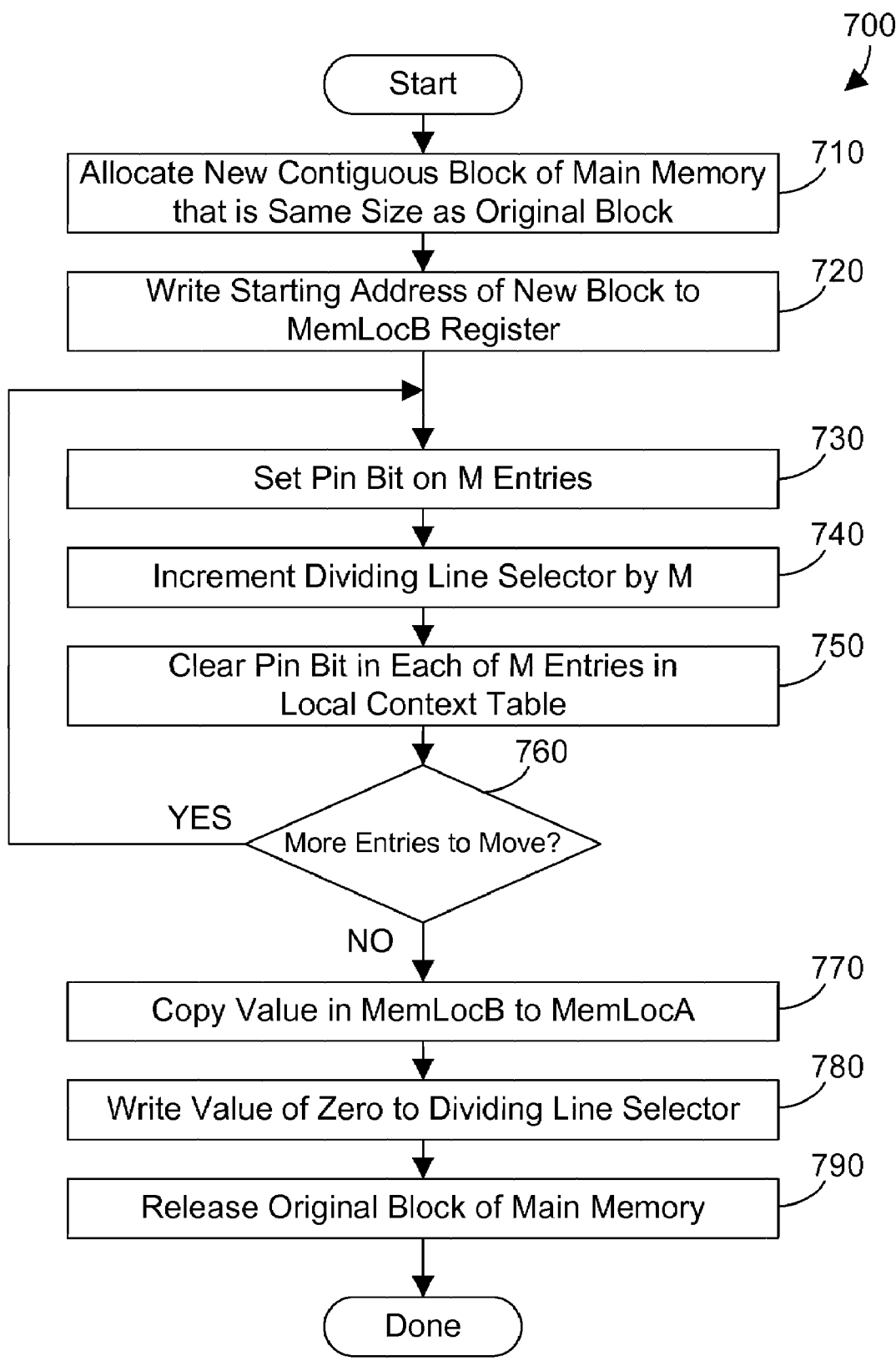
FIG. 7 is a flow diagram of a method in accordance with the preferred embodiments for moving context memory structures from a first memory location to a second memory location while the computer system of FIG. 1 continues to function.

Referring to FIG. 7, a method 700 is preferably performed by the adapter logic 169 to move context information from one block of memory to a different block of memory. Note that the function of the adapter depends on the functions described in methods 400, 500 and 600 previously discussed with reference to FIGS. 4-6. First, a new contiguous block of main memory that is the same size as the original block is allocated (step 710). The starting address of the new block is then written to the MemLocB register (step 720). The pin bit is then set on M context entries in the local context table (step 730) that correspond to the first M context entries in the original block of memory, where M is any number from one to the number of entries in the local context table minus one with the actual value of M being a design choice. Typically a convenient value for M would be the number of entries on a memory page. The dividing line selector register is then incremented by M (step 740). The pin bits on each of the M entries in the local context table are then cleared (step 750). Note that incrementing of the dividing line selector register in step 740 and the clearing of the pin bits in step 750 will allow the M context entries in the local context table to be cast out as shown in method 600 in FIG. 6, and the location they will be cast out to is the new block of memory pointed to by the address in the MemLocB register. In effect, a page of context entries is brought into the local context table by setting the pin bits for all context entries in the page. The dividing line selector register is then incremented by the number of context entries on the page, and the pin bits are then cleared, allowing this page of context entries to be cast out to the new block of memory. If there are more entries to move (step 760=YES), method 700 loops back to step 730 and continues. Once all entries have been moved (step 760=NO), all of the context information that was in the original block of memory has been moved to the new block of memory. The value in the MemLocB register is copied to the MemLocA register (step 770), a value of zero is written to the dividing line selector register (step 780), and the original block of main memory is released (step 790). Once step 770 is complete, the adapter is accessing all the hardware context structures in the new block of memory. As a result, after step 790 is performed, the now unused block of original memory is free and can be removed or changed by the system.

Figure 5:
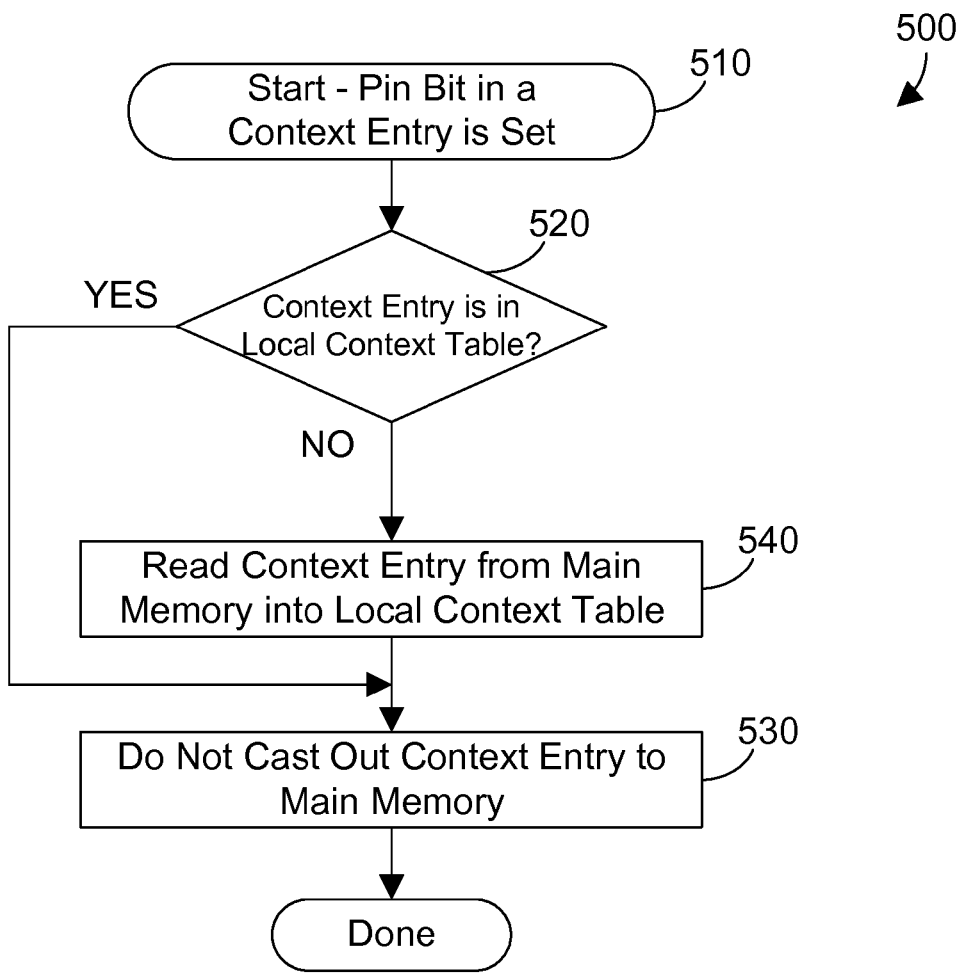
FIG. 5 is a flow diagram of a method in accordance with the preferred embodiments for the adapter of FIG. 1 to function when the pin bit in a context entry in the local context memory is set.

In the most preferred implementation, methods 400, 500 and 600 in FIGS. 4-6 are preferably performed in hardware, while method 700 in FIG. 7 is preferably implemented in software. Note, however, that one skilled in the art will appreciate that all of the adapter logic 169 represented in methods 400, 500, 600 and 700 could be implemented in software, or could be implemented in any suitable combination of hardware and software. The most preferred implementation that implements methods 400, 500 and 600 in hardware, and implements method 700 in software, allows the hardware and software to function asynchronously with respect to each other. The software performs its functions shown in method 700 in FIG. 7, and the hardware will automatically take care of moving the context memory according to its functions in methods 400, 500 and 600 in FIGS. 4-6. This specific division of function between hardware and software thus provides significant advantages, but is not limiting of the claims herein.

Figure 8:
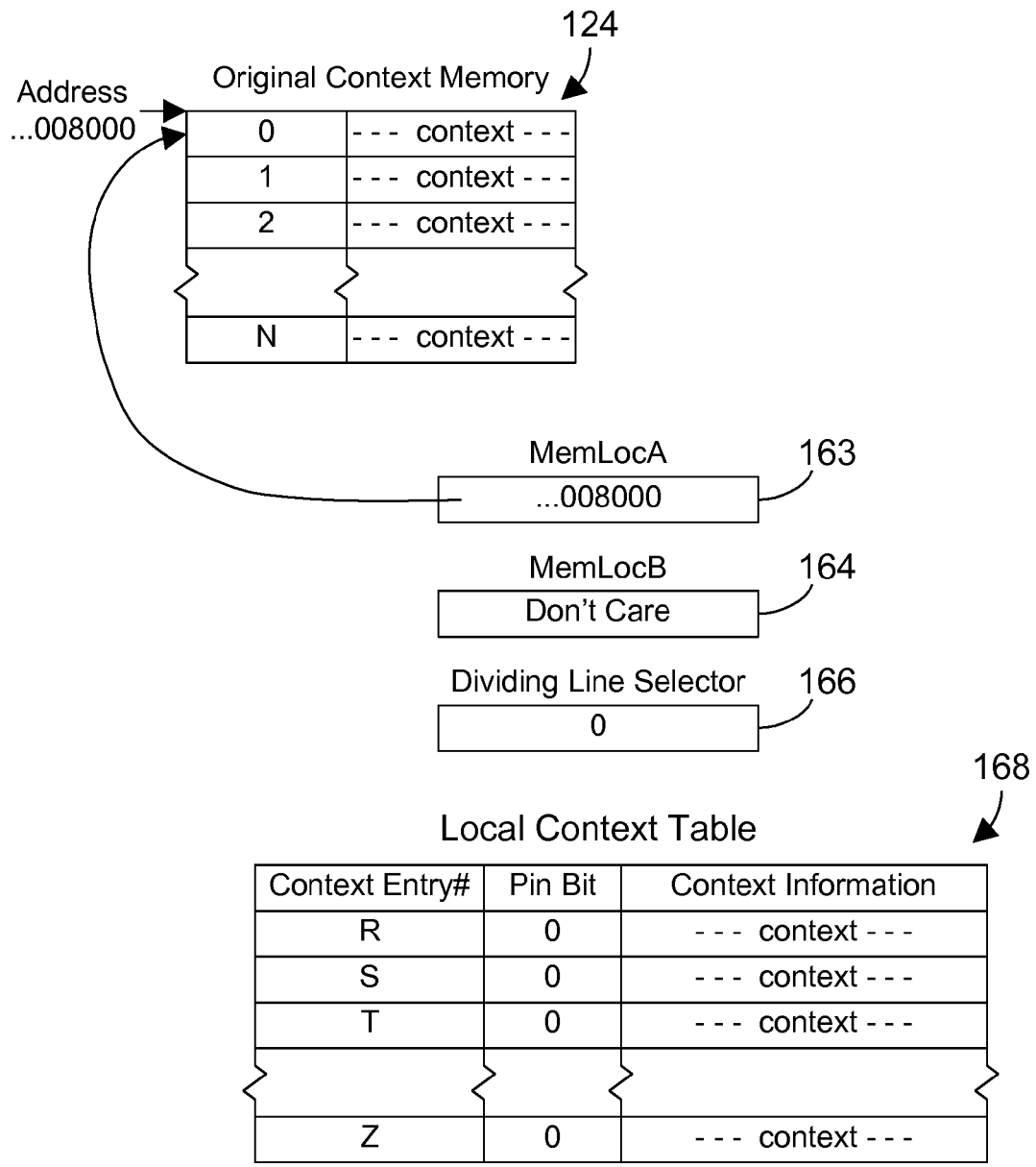
FIG. 8 is a block diagram showing the original context memory 124, registers 163, 164 and 166, and local context table 168 in FIG. 1 before method 700 in FIG. 1 is executed.

An example is now presented to illustrate the movement of context information from a first block of memory to a second block of memory within the scope of the preferred embodiments. Referring to FIG. 8, we assume the original context memory has a beginning address of . . . 008000 for its first context entry 0. Note that the MemLocA register 163 contains the address . . . 008000, thus pointing to the original context memory 124. The value in the MemLocB register 164 does not matter, because the value in the dividing line selector register 166 is zero, which means that all accesses to the context memory will be made to the original context memory 124 referenced in MemLocA 163. At this point in time, we assume the local context table 168 contains any suitable context entries that may be used by the adapter.

Figure 9:
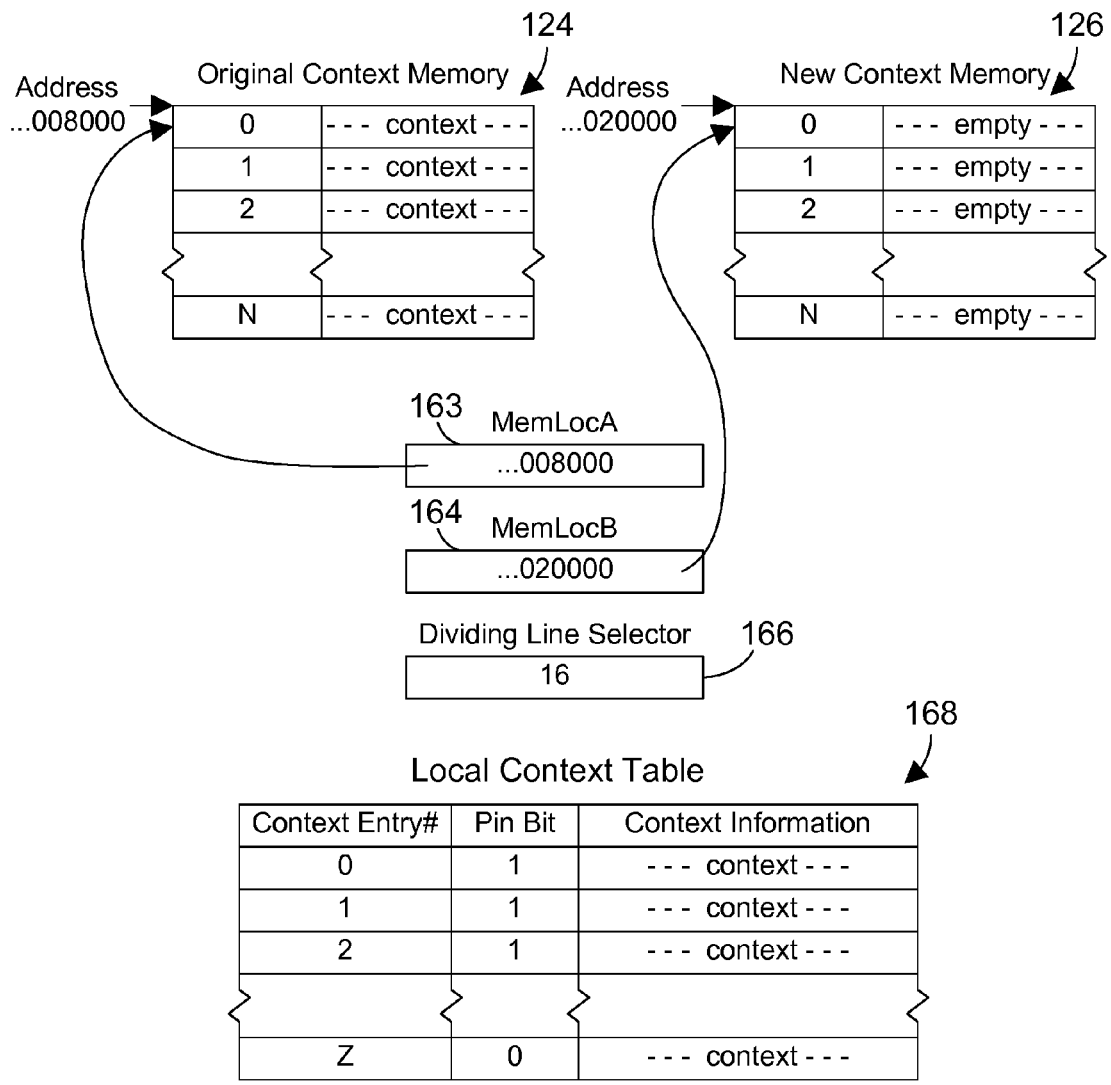
FIG. 9 is a block diagram showing the original context memory 124, new context memory 126, registers 163, 164 and 166, and local context table 168 in FIG. 1 after steps 710-740 in FIG. 7 have been performed.
Figure 10:
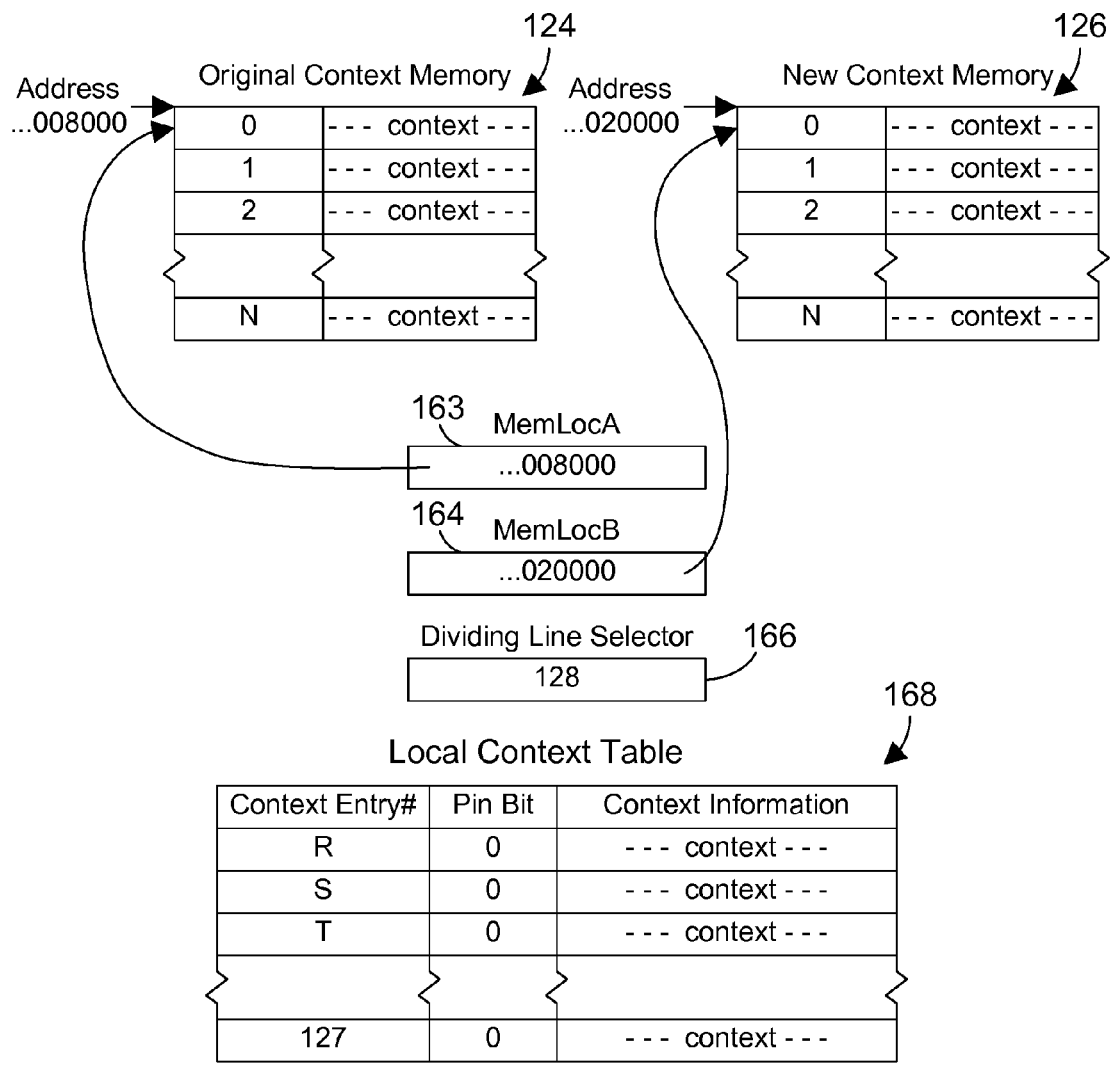
FIG. 10 is a block diagram showing the original context memory 124, new context memory 126, registers 163, 164 and 166, and local context table 168 in FIG. 1 after all entries have been moved (step 760=NO) in FIG. 7.
Figure 11:
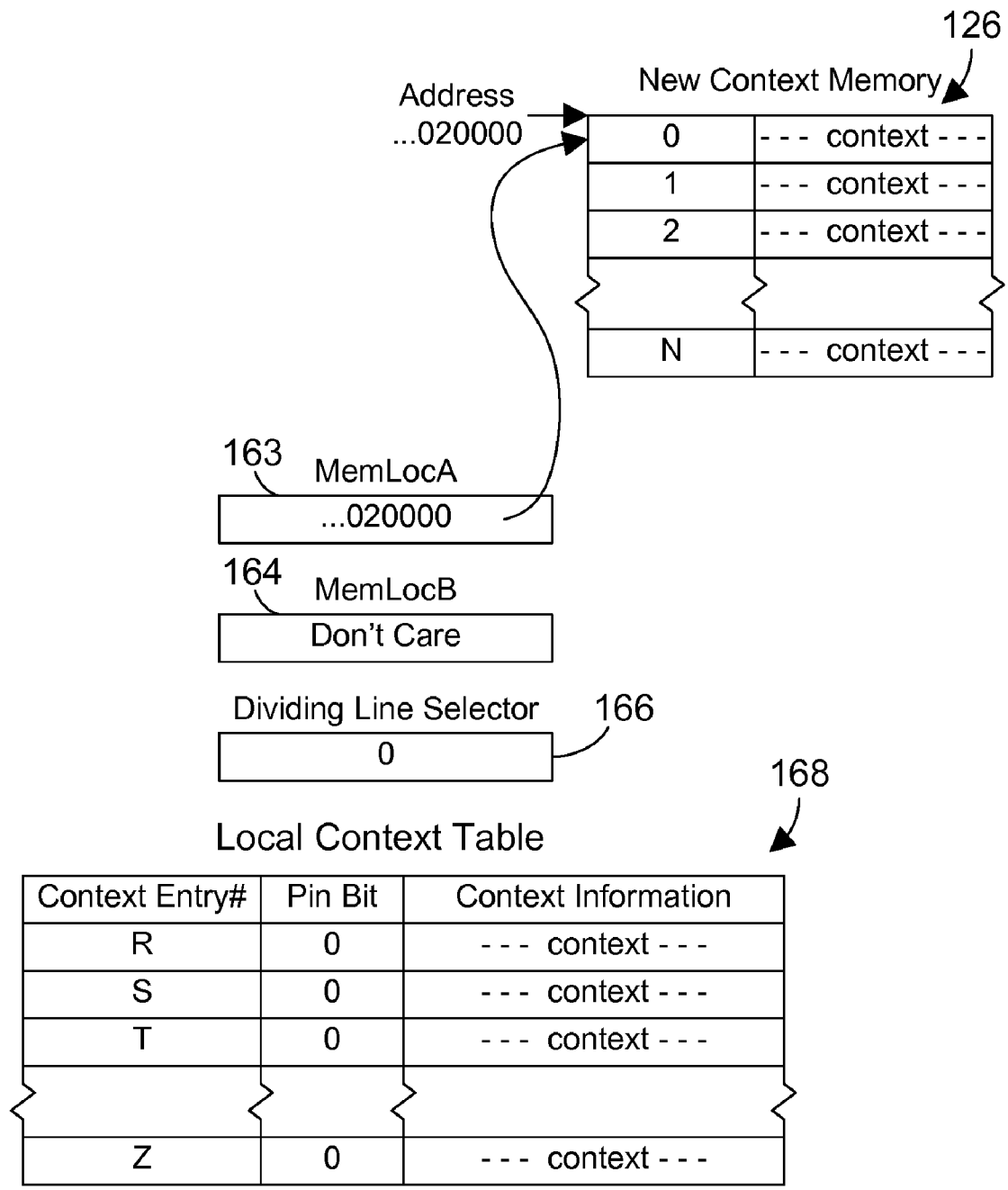
FIG. 11 is a block diagram showing the relocated hardware context structures after completing all of the steps in method 700 in FIG. 7.

At this point we assume that steps 710, 720, 730 and 740 are performed in method 700 of FIG. 7, with the results shown in FIG. 9. Step 710 allocates the new context memory 126. Note that the context portion of the context entries in the new context memory 126 is shown to be empty, because no context information has been written to the new context memory 126 at this point in time. We assume this new context memory 126 has a starting address of . . . 020000. Step 720 writes the starting address of the new context memory 126 to the MemLocB register 164, as shown in FIG. 9. Step 730 sets the pin bit on M entries in the local context table 168. We assume for this example that each page of memory contains sixteen context entries, which means that M=16. For the sake of convenience, only the first three of the sixteen entries are shown in FIG. 9 to have their pin bits set. Step 740 increments the dividing line selector register 166 by M (or sixteen), as shown in FIG. 9. At this point the local context table contains the valid context information for context entries 0-15. Next the pin bits for these sixteen context entries in the local context table are cleared in step 750 of FIG. 7. The clearing of the pin bits now makes it possible for the context entries in the local context table 168 to be cast out to the new context memory 126. Because the dividing line selector 166 has a value of 16, the first sixteen context entries (0-15) will be cast out to the new context memory 126, while any accesses to any context entry above 15 will access the context entries in the original context memory 124. We assume that steps 730-760 are repeated for each of the N pages stored in the local context table 168. We assume for this example that the local context table 168 contains eight pages of memory, for a total of 128 context entries. Thus, when there are no more entries to move (step 760=NO), the value in the dividing line selector register will be 128, as shown in FIG. 10, and all of the context memory will have been moved from the original context memory 124 to the new context memory 126. At this point steps 770, 780 and 790 may be performed, which produces the system shown in FIG. 11. Step 770 writes the value of . . . 020000 in the MemLocB register 164 to the MemLocA register 163, as shown in FIG. 11. A zero is written to the dividing line selector register 166, and the original block or main memory 124 is released (and thus does not appear in FIG. 11). At this point in time, the adapter accesses the new context memory 126.

One skilled in the art will readily appreciate the usefulness of the present invention. Let's assume, for example, that a memory card in a computer system that contains context information has a portion of the card that fails. We assume the failure does not affect the context information stored on the card. Obviously, the defective memory card now needs to be replaced. With the prior art, one would have to shut down all connections in order to move the context information to a new location that is not on the defective card, install the new card, copy the context information to the new card, and re-establish all of the connections. This effectively shuts down the computer system for a significant period of time. The present invention, in contrast, allows the context memory to be moved from the defective card to some other location, then to the new memory card, while maintaining all connections. The computer system may thus be maintained and the context memory may be relocated without shutting down any connections in the adapter.

In the most preferred implementation, the hardware context structures are stored in a memory that may be randomly accessed very quickly, such as Random Access Memory (RAM). Thus, in most cases, the hardware context structures will be read from one block of RAM into a different block of RAM in order to avoid degradation of system performance. Note, however, that the present invention expressly extends to any and all storage devices that may reside within the virtual address space of a computer system.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

The invention claimed is:

1. An apparatus comprising:
   at least one processor;
   a memory coupled to the at least one processor;
   a first block of the memory that contains hardware context information;
   a hardware adapter external to the memory and coupled to the at least one processor, the hardware adapter supporting a plurality of virtual connections that each have corresponding hardware context information stored in the first block of the memory, the hardware adapter reading the hardware context information for the plurality of virtual connections from the first block of the memory and writing the hardware context information for the plurality of virtual connections to a second block of the memory without shutting down the plurality of virtual connections.

2. The apparatus of claim 1 wherein the hardware adapter comprises:
a first register;
a second register;
a dividing line selector register that contains a context entry number; and
a local context table that contains a portion of the hardware context information in the first block of memory.

3. The apparatus of claim 2 wherein the local context table includes a pin bit for each context entry in the local context table, wherein a setting of a pin bit causes the corresponding context entry to be retrieved from the memory into the local context table, and wherein the hardware adapter keeps the corresponding context entry in the local context table as long as the pin bit is set.

4. The apparatus of claim 3 wherein a clearing of a pin bit allows the hardware adapter to write the corresponding context entry to the memory.

5. The apparatus of claim 4 wherein the hardware adapter accesses a block of memory with a beginning address specified in the first register when a desired context entry has a context entry number greater than or equal to a value in the dividing line register, and accesses a block of memory with a beginning address specified in the second register when the desired context entry has a context entry number less than the value in the dividing line register.

6. The apparatus of claim 5 wherein the hardware adapter moves the hardware context information for the plurality of virtual connections in the first block of memory to the second block of memory by performing the steps of:
(A) writing the starting address of the second block of memory to the second register;
(B) setting a pin bit in the local context table for a plurality of entries in the first block of memory;
(C) reading the plurality of entries from the first block of memory into the local context table;
(D) incrementing the dividing line selector by the number of the plurality of entries read in step (C); and
(E) clearing the pin bit in each of the plurality of entries read in step (C), thereby causing each of the plurality of entries to be automatically written to the second block of memory when each of the plurality of entries is cast out of the local context table.

7. The apparatus of claim 2 wherein the hardware adapter accesses a block of memory with a beginning address specified in the first register when a desired context entry has a context entry number greater than or equal to a value in the dividing line register, and accesses a block of memory with a beginning address specified in the second register when the desired context entry has a context entry number less than the value in the dividing line register.

8. An apparatus comprising:
at least one processor;
a memory coupled to the at least one processor;
a first block of the memory that contains hardware context information;
a hardware adapter external to the memory and coupled to the at least one processor, the hardware adapter supporting a plurality of virtual connections that each have corresponding hardware context information stored in the first block of the memory, the hardware adapter comprising:
a first register;
a second register;
a dividing line selector register that contains a context entry number; and
a local context table that contains a portion of the hardware context information in the first block of memory, wherein the local context table includes a pin bit for each context entry, wherein a setting of a pin bit causes the corresponding context entry to be retrieved from the memory into the local context table;
wherein the hardware adapter keeps a context entry in the local context table as long as the corresponding pin bit is set, and wherein a clearing of a pin bit allows the hardware adapter to cast out the corresponding context entry to the memory, wherein the hardware adapter accesses a block of memory with a beginning address specified in the first register when a desired context entry has a context entry number greater than or equal to a value in the dividing line register, and accesses a block of memory with a beginning address specified in the second register when the desired context entry has a context entry number less than the value in the dividing line register, wherein the hardware adapter moves the hardware context information for the plurality of virtual connections in the first block of memory to the second block of memory without shutting down the plurality of virtual connections by performing the steps of:
(A) writing the staffing address of a second block of the memory to the second register;
(B) setting a pin bit in the local context table for a plurality of entries in the first block of memory;
(C) reading the plurality of entries from the first block of memory into the local context table;
(D) incrementing the dividing line selector by the number of the plurality of entries read in step (C); and
(E) clearing the pin bit in each of the plurality of entries read in step (C), thereby causing each of the plurality of entries to be automatically written to the second block of memory when each of the plurality of entries is cast out of the local context table.

9. The apparatus of claim 8 wherein the plurality of entries read in step (C) comprises a number of entries that is contained within a single page of memory.

10. The apparatus of claim 9 wherein the hardware adapter repeats steps (B)-(E) for each of N pages of memory, where N equals a number of memory pages in the second block of the memory.

11. A program product comprising:
(A) adapter logic for a hardware adapter external to a memory that supports a plurality of virtual connections that each have corresponding hardware context information stored in a first block of the memory, the adapter logic reading hardware context information for the plurality of virtual connections from the first block of memory and writing the hardware context information for the plurality of virtual connections to a second block of memory without shutting down the plurality of virtual connections; and
(B) computer-readable recordable media bearing the adapter logic.

12. The program product of claim 11 wherein the adapter logic accesses:

a first register;

a second register;

a dividing line selector register that contains a context entry number; and a local context table that contains a portion of the hardware context information in the first block of memory.

13. The program product of claim 12 wherein the local context table includes a pin bit for each context entry in the local context table, wherein a setting of a pin bit causes the corresponding context entry to be retrieved from the memory into the local context table, and wherein the adapter logic keeps the corresponding context entry in the local context table as long as the pin bit is set.

14. The program product of claim 13 wherein a clearing of a pin bit allows the adapter logic to write the corresponding context entry to the memory.

15. The program product of claim 14 wherein the adapter logic accesses a block of memory with a beginning address specified in the first register when a desired context entry has a context entry number greater than or equal to a value in the dividing line register, and accesses a block of memory with a beginning address specified in the second register when the desired context entry has a context entry number less than the value in the dividing line register.

16. The program product of claim 15 wherein the adapter logic moves the hardware context information for the plurality of virtual connections in the first block of memory to the second block of memory by performing the steps of:

(A) writing the starting address of the second block of memory to the second register;

(B) setting a pin bit in the local context table for a plurality of entries in the first block of memory;

(C) reading the plurality of entries from the first block of memory into the local context table;

(D) incrementing the dividing line selector; and (E) clearing the pin bit in each of the plurality of entries read in step (C), thereby causing each of the plurality of entries to be automatically written to the second block of memory when each of the plurality of entries is cast out of the local context table.

17. The program product of claim 12 wherein the adapter logic accesses a block of memory with a beginning address specified in the first register when a desired context entry has a context entry number greater than or equal to a value in the dividing line register, and accesses a block of memory with a beginning address specified in the second register when the desired context entry has a context entry number less than the value in the dividing line register.

18. A program product comprising:

(A) adapter logic for a hardware adapter supporting a plurality of virtual connections that each have corresponding hardware context information stored in a first block of memory, the adapter logic comprising:

logic for using a local context table that contains a portion of the hardware context information in the first block of memory, wherein the local context table includes a pin bit for each context entry, wherein a setting of a pin bit causes a corresponding context entry to be retrieved from the first block of memory into the local context table;

wherein the adapter logic keeps a context entry in the local context table as long as the corresponding pin bit is set, and wherein a clearing of a pin bit allows the adapter logic to cast out the corresponding context entry to the memory, wherein the adapter logic accesses a block of memory with a beginning address specified in a first register when a desired context entry has a context entry number greater than or equal to a value in a dividing line register, and accesses a block of memory with a beginning address specified in a second register when the desired context entry has a context entry number less than the value in the dividing line register, wherein the adapter logic moves the hardware context information for the plurality of virtual connections in the first block of memory to a second block of memory without shutting down the plurality of virtual connections by performing the steps of:

(A1) writing the staffing address of the second block of memory to the second register;

(A2) setting a pin bit in the local context table for a plurality of entries in the first block of memory;

(A3) reading the plurality of entries from the first block of memory into the local context table;

(A4) incrementing the dividing line selector register by the number of the plurality of entries read in step (A3); and (A5) clearing the pin bit in each of the plurality of entries read in step (A3), thereby causing each of the plurality of entries to be automatically written to the second block of memory when each of the plurality of entries is cast out of the local context table; and (B) computer-readable recordable media bearing the adapter logic.

19. The program product of claim 18 wherein the plurality of entries read in step (C) comprises a number of entries that is contained within a single page of memory.

20. The program product of claim 19 wherein the adapter logic repeats steps (B)-(E) for each of N pages of memory, where N equals a number of memory pages in the second memory block.

* * * * *